US012715524B2

(12) United States Patent
Paolini et al.

(10) Patent No.: US 12,715,524 B2
(45) Date of Patent: Aug. 25, 2026

(54) SPORTS VEHICLE WITH DOUBLE SPOILER

(71) Applicant: FERRARI S.P.A., Modena (IT)

(72) Inventors: Andrea Paolini, Modena (IT); Rubens Mauro Curatola, Modena (IT); Matteo Biancalana, Modena (IT)

(73) Assignee: FERRARI S.P.A., Modena (MO) (IT)

( * ) Notice: Subject to any disclaimer, the term of this patent is extended or adjusted under 35 U.S.C. 154(b) by 260 days.

(21) Appl. No.: 18/735,714

(22) Filed: Jun. 6, 2024

(65) Prior Publication Data

US 2024/0417007 A1 Dec. 19, 2024

(30) Foreign Application Priority Data

Jun. 16, 2023 (IT) ........................ 102023000012405

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC ....... B62D 35/007; B62D 37/02; B62D 35/00
USPC .......... 296/180.5, 180.1, 180.2, 180.3, 181.5
See application file for complete search history.

(56) References Cited

U.S. PATENT DOCUMENTS

| | | | | |
|---|---|---|---|---|
| 5,678,884 A * | 10/1997 | Murkett | ................ | B60K 13/02 296/180.1 |
| 5,863,090 A * | 1/1999 | Englar | .................. | B62D 37/02 296/180.1 |
| 6,170,904 B1 | 1/2001 | Schaedlich et al. | | |
| 2022/0001941 A1* | 1/2022 | Bauer | ................. | B62D 35/001 |
| 2024/0025493 A1* | 1/2024 | Multari | ................. | B62D 37/02 |
| 2024/0075994 A1* | 3/2024 | Wiech | ................... | B62D 37/02 |

FOREIGN PATENT DOCUMENTS

| | | |
|---|---|---|
| DE | 102012111849 A1 | 6/2014 |
| DE | 102019103451 B3 | 6/2020 |

OTHER PUBLICATIONS

Translation DE 102019103451 (Year: 2019).*
Italian Search Report in IT Application No. 202300012405 mailed Jan. 10, 2024, an English Translation attached hereto (7 pages).

* cited by examiner

*Primary Examiner* — Amy R Weisberg
*Assistant Examiner* — Denise Lynne Esquivel
(74) *Attorney, Agent, or Firm* — Leason Ellis LLP

(57) ABSTRACT

A sports vehicle has a support frame, a passenger compartment, a fixed rear spoiler, a movable rear spoiler, and an operating device for moving the movable rear spoiler between a lifted position and a lowered position.

9 Claims, 3 Drawing Sheets

SPORTS VEHICLE WITH DOUBLE SPOILER

CROSS-REFERENCE TO RELATED APPLICATIONS

This patent application claims priority from Italian patent application no. 102023000012405 filed on Jun. 16, 2023, the entire disclosure of which is incorporated herein by reference.

TECHNICAL FIELD

The present invention relates to a sports vehicle.

In particular, the present invention relates to a sports vehicle of the type comprising a support frame defining at least part of a bottom floor of the car; a passenger compartment mounted on the support frame and projecting upwards from the bottom floor; and a power engine for moving the car.

The sports vehicle further comprises a fixed rear spoiler, which is mounted at the back of the passenger compartment, extends above a rear hood, and is provided with an airfoil configured to generate a downward vertical load on the sports vehicle and increase the adherence thereof to the ground.

BACKGROUND

Known sports vehicles of the type described above have some drawbacks mainly deriving from the fact that the vertical load generated on the sports vehicle by the fixed rear spoiler is relatively low and insufficient for guaranteeing the correct behaviour of the sports vehicle in braking or driving situations in curve.

SUMMARY

The object of the present invention is to provide a sports vehicle which is exempt from the drawbacks set forth above and which is simple and cost-effective to manufacture.

According to the present invention, a sports vehicle is provided as claimed in the appended claims.

BRIEF DESCRIPTION OF THE DRAWINGS

The present invention will now be described with reference to the accompanying drawings, which illustrate a non-limiting example embodiment thereof, wherein.

DESCRIPTION OF EMBODIMENTS

Figure 1:
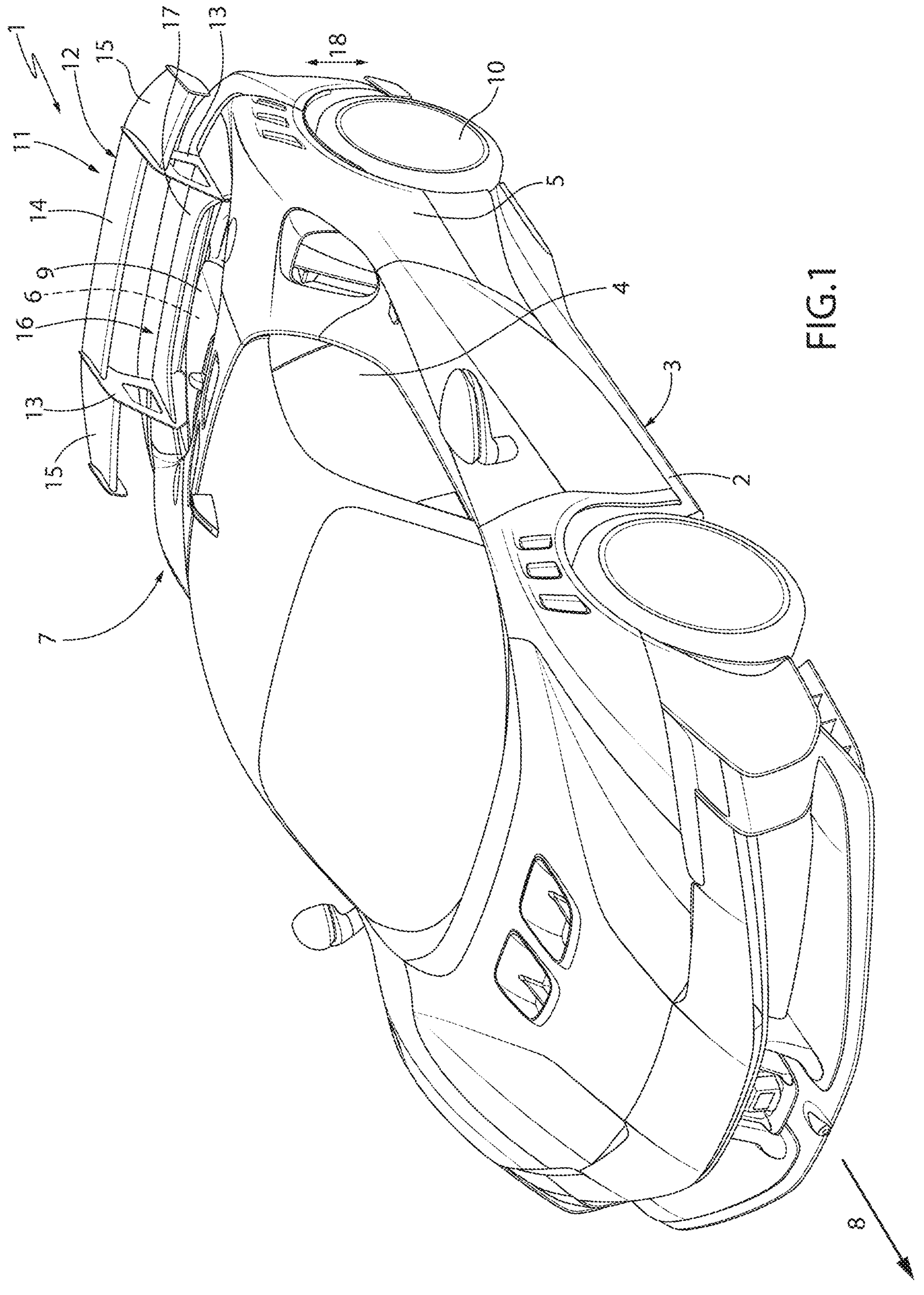
FIG. 1 is a schematic perspective view, with parts removed for clarity, of a preferred embodiment of the sports vehicle of the present invention.
Figure 2:
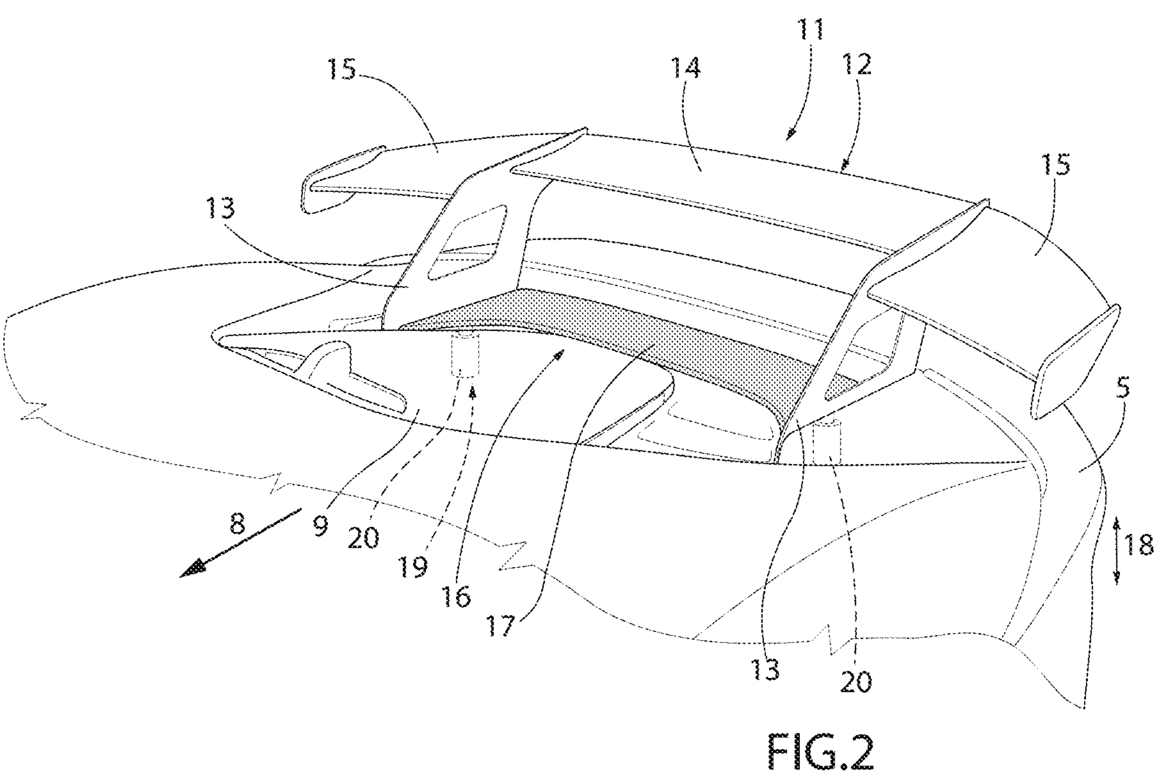
FIGS. 2 and 3 are two schematic perspective views, with parts removed for clarity, of a detail of the sports vehicle of FIG. 1 illustrated in two different operating positions.
Figure 3:
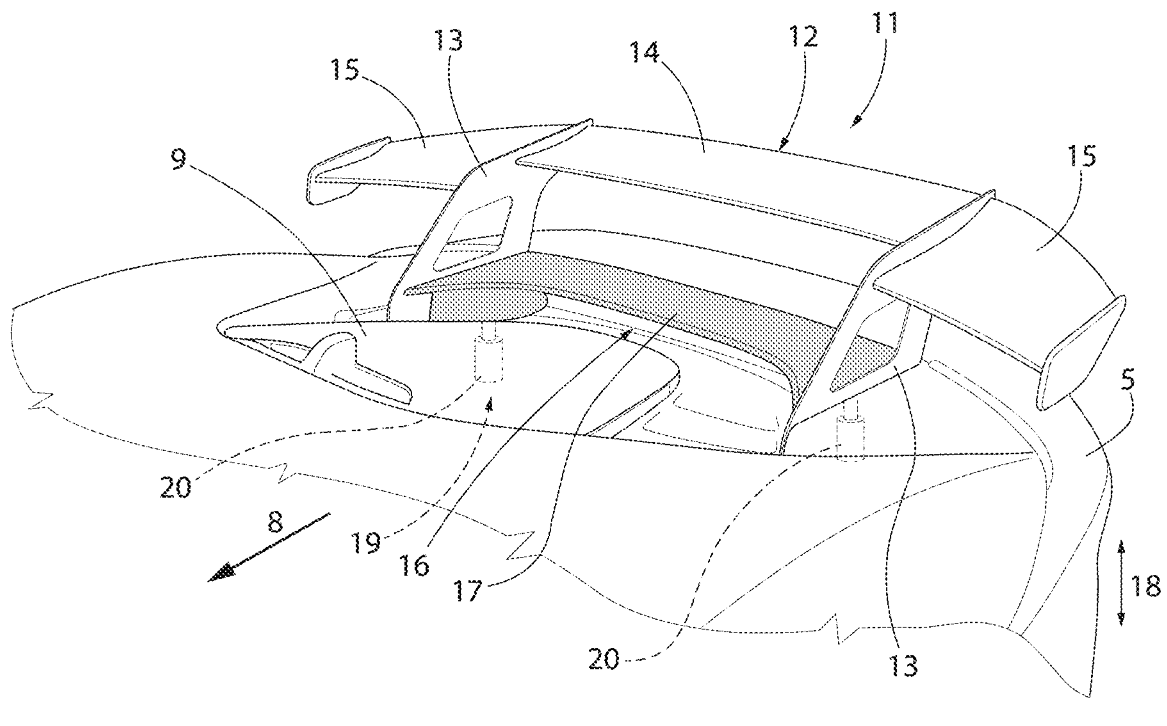

With reference to FIGS. 1, 2, and 3, reference numeral 1 indicates, as a whole, a sports vehicle comprising a support frame 2 defining at least part of a bottom floor 3 of the sports vehicle 1, a passenger compartment 4 mounted on the frame 2 and projecting upwards from the floor 3, and an outer body 5.

The sports vehicle 1 further comprises a power engine 6 of known type, which is mounted in the centre of a rear zone 7 of the frame 2, in particular parallel to a forward moving direction 8 of the sports vehicle 1, is arranged under a rear hood 9 of the body 5, and is connected in a known manner to two rear drive wheels 10 of the sports vehicle 1.

The sports vehicle 1 is further provided with a fixed rear spoiler 11, which is mounted in the area of the zone 7, extends above the body 5, and comprises an airfoil 12 extending transversal to the direction 8, and a pair of support plates 13 for connecting the airfoil 12 to the body 5.

The plates 13 are connected in intermediate points of the airfoil 12, which comprises a central portion 14 extending between the two plates 13 and two side portions 15 obtained on opposite sides of the portion 14 and on the outside of the plates 13.

The portion 14 has a width, measured parallel to the direction 8, substantially constant and smaller than the width of the portions 15, this too measured parallel to the direction 8 in the area of the plates 13.

The sports vehicle 1 is further provided with a movable rear spoiler 16 comprising an airfoil 17, which is mounted between the two plates 13, and is staggered relative to the portion 14 of the airfoil 12 in the direction 8. In other words, the spoiler 11, in this case the portion 14, and the spoiler 16, in this case the airfoil 17, do not overlap each other in a direction 18 transversal to the direction 8 and substantially perpendicular to the road surface (not shown).

The spoiler 16 is movable, under the thrust of an operating device 19, between a lifted position (FIG. 3), in which the airfoil 17 is substantially coplanar to the body 5, and a lowered position (FIG. 2) in which the airfoil 17 is arranged under the body 5.

The device 19 comprises, in this case, two electric motors 20, which are accommodated under the body 5, are fixed to the frame 2, and have respective output rods connected to the spoiler 16.

When the spoiler 16 is arranged in its lifted position, the spoilers 11 and 16 exert on the sports vehicle 1 a relatively low overall vertical load and a relatively low overall aerodynamic drag smaller than the sum of the aerodynamic drag of the spoiler 11 and of the aerodynamic drag of the spoiler 16.

When the spoiler 16 is arranged in its lowered position, the spoilers 11 and 16 exert on the sports vehicle 1 a relatively high overall aerodynamic drag and a relatively high overall vertical load greater than the sum of the vertical load of the spoiler 11 and of the vertical load of the spoiler 16.

Furthermore, since the portion 14 and the airfoil 17 do not overlap each other in the direction 18, the vertical load exerted by the spoiler 11 on the electric motors 20 of the spoiler 16 is relatively low and the electric motors 20 are relatively simple, light and cost-effective.

Figure 4:
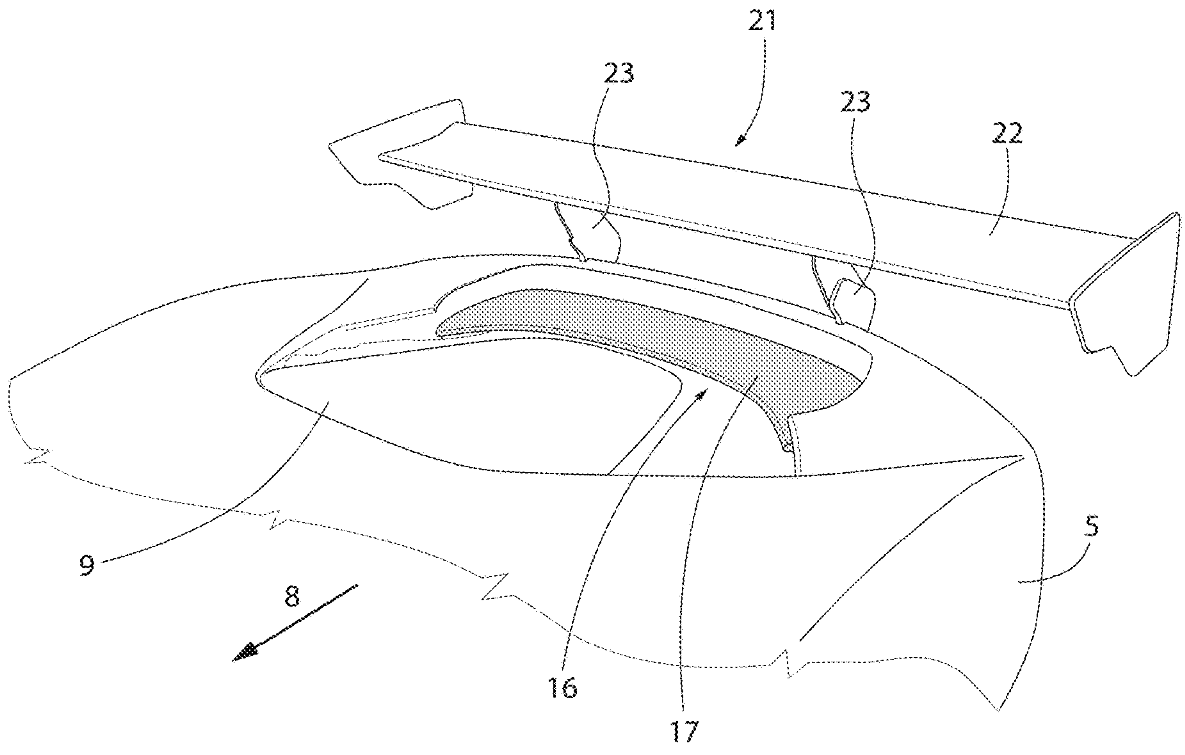
FIG. 4 is a schematic perspective view, with parts removed for clarity, of a variation of the detail of FIGS. 2 and 3.

The variation shown in FIG. 4, not being part of the present invention, differs from what shown in the previous figures due to the fact that, in said variation, the fixed rear spoiler 11 is eliminated and replaced by a fixed rear spoiler 21, which is mounted in the area of the zone 7, extends above the body 5, and comprises an airfoil 22 transversal to the direction 8 and a pair of support plates 23 for connecting the airfoil 22 to the body 5.

The fixed rear spoiler 21 and the movable rear spoiler 16 overlap each other in the direction 18 and the airfoil 22 has a substantially constant width, measured parallel to the direction 8.

Since the fixed rear spoiler 21 and the movable rear spoiler 16 overlap each other in the direction 18:

the lifted position of the movable rear spoiler 16 guarantees a relatively low aerodynamic drag smaller than that obtained with the fixed rear spoiler 11; and the vertical load exerted by the spoiler 21 on the electric motors 20 of the spoiler 16 is relatively high and entails the utilization of electric motors 20 having weight and dimensions greater than those of the electric motors 20 utilized with the fixed rear spoiler 11.

According to a variation not shown, not being part of the present invention, the spoilers 16 and 21 are partially overlapped so as to produce aerodynamic drag values and vertical load values comprised between the values of the two configurations described in Figures from 1 to 4.

The invention claimed is:

1. A sports vehicle comprising a support frame (2); a passenger compartment (4); an outer body (5); a fixed rear spoiler (11; 21); a movable rear spoiler (16); and an operating device (19) to move the movable rear spoiler (16) between a lifted position and a lowered position; and characterized in that the fixed rear spoiler (11) and the movable rear spoiler (16) are staggered relative to each other in a forward moving direction (8) of the sports vehicle and that the movable rear spoiler (16) is substantially coplanar to the outer body (5) when arranged in its lifted position and extends under the outer body (5) when arranged in its lowered position.

2. The sports vehicle according to claim 1, wherein the fixed rear spoiler (11; 21) comprises an airfoil (12; 22) and a pair of supports (13; 23) to couple the airfoil (12; 22) to a body (5) of the sports vehicle.

3. The sports vehicle according to claim 2, wherein the supports (13; 23) are connected in intermediate points of the airfoil (12; 22).

4. The sports vehicle according to claim 3, wherein the movable rear spoiler (16) is mounted between the two supports (13).

5. The sports vehicle according to claim 3, wherein the airfoil (12) comprises a central portion (14) extending between the two supports (13) and two side portions (15) obtained on opposite sides of the central portion (14) and on the outside of the supports (13).

6. The sports vehicle according to claim 5, wherein the central portion (14) of the airfoil (12) and the movable rear spoiler (16) are staggered relative to each other in said forward moving direction (8).

7. The sports vehicle according to claim 5, wherein the central portion (14) has a width, measured parallel to said forward moving direction (8), which is smaller than a width of a side portion (15) measured parallel to the forward moving direction (8) in the area of the relative support (13).

8. The sports vehicle according to claim 1, wherein the operating device (19) comprises at least one electric motor (20).

9. The sports vehicle according to claim 1, wherein the fixed rear spoiler (11) and the movable rear spoiler (16) do not overlap each other in a direction (18) substantially transversal to said forward moving direction (8).

* * * * *